United States Patent

Bradford et al.

Patent Number: 5,912,640
Date of Patent: Jun. 15, 1999

[54] BOOST ENGINE CUTOFF ESTIMATION IN DOPPLER MEASUREMENT SYSTEM

[75] Inventors: Bert L. Bradford, Damascus; Richard A. Lodwig, Gaithrsburg, both of Md.

[73] Assignee: Lockheed Martin Corporation, Bethesda, Md.

[21] Appl. No.: 08/972,568

[22] Filed: Nov. 18, 1997

Related U.S. Application Data

[63] Continuation of application No. 08/917,381, Aug. 26, 1997.

[51] Int. Cl.$^6$ .................................................. G01S 13/52

[52] U.S. Cl. ............................................ 342/99; 342/115

[58] Field of Search .......................... 342/99, 116, 109, 342/104, 101, 67, 62, 115

[56] References Cited

U.S. PATENT DOCUMENTS

| 3,876,169 | 4/1975 | Fitzgerald et al. | 342/62 |
| 4,672,381 | 6/1987 | Labbé et al. | 342/99 |

*Primary Examiner*—Daniel T. Pihulic
*Attorney, Agent, or Firm*—Lane, Aitken & McCann

[57] ABSTRACT

An estimate of the time of the boost engine cut-off of a missile is provided by irradiating the missile after it is launched with continuous wave signals. The reflected continuous wave signals are detected and an inflection in the Doppler measurements of the reflected continuous wave signals provide an initial estimate of the boost engine cut-off time. A Kalman filter is used to provide initial estimates of the position and velocity of the missile at the boost engine cut-off time and a square root information filter responding to the Doppler measurement residuals after boost engine cut-off reduces the error in the initial estimate of the boost engine cut-off time to a minimum.

7 Claims, 2 Drawing Sheets

BOOST ENGINE CUTOFF ESTIMATION IN DOPPLER MEASUREMENT SYSTEM

This application is a continuation of application Ser. No. 08/917,381, filed Aug. 26, 1997.

This invention relates to a system for estimating the boost engine cut-off (BECO) time, position, velocity, and ballistic coefficient for a missile from the Doppler shift in continuous wave (CW) signals reflected from the missile.

BACKGROUND OF THE INVENTION

Accurate knowledge of the BECO time is important in obtaining the estimation of the impact point of a ballistic missile. Prior to the present invention, BECO time was estimated by means of an infrared sensor system, which estimated the BECO time from termination of infrared radiation from the missile above a selected threshold. This technique of estimating the BECO time was subject to significant error caused by residual heat in the missile. Error in the BECO time leads to error in the BECO position and velocity and ultimately leads to an error in the estimated impact point.

SUMMARY OF THE INVENTION

In accordance with the invention, the missile is illuminated with continuous wave (CW) signals as it is launched from its launch point up through and past the boost engine cut-off so that the CW signals are reflected from the missile and received during the initial part of the trajectory from the launch point up to the BECO position and during a portion of the trajectory beyond the BECO position. The Doppler shift of the received signals is directly related to the velocity of the missile relative to the illuminator and relative to the receiver. As a result, the Doppler measurement undergoes an inflection at the BECO time which can be detected and this detection thus provides an estimate of the BECO time. In accordance with the invention, this estimate of the BECO time is used as an initial estimate which is then corrected by the system of the present invention to a more accurate value. Following the BECO time, the missile will be in free fall and a ballistic model of this free fall trajectory is used to predict Doppler measurements from which residuals are calculated. The residuals are used in a differential correction algorithm to provide an accurate estimate of the BECO time. A Kalman filter provides an estimate of position and velocity data for the missile trajectory prior to the estimated BECO time and propagates this data to the BECO time to provide initial estimates of the missile position and velocity at the BECO time. Using these initial estimates and the ballistic free fall model for the trajectory after the estimated BECO time, the Doppler measurement residuals are calculated. From these residuals, the estimated BECO time is corrected to an accurate estimate.

DESCRIPTION OF A PREFERRED EMBODIMENT

Figure 1:
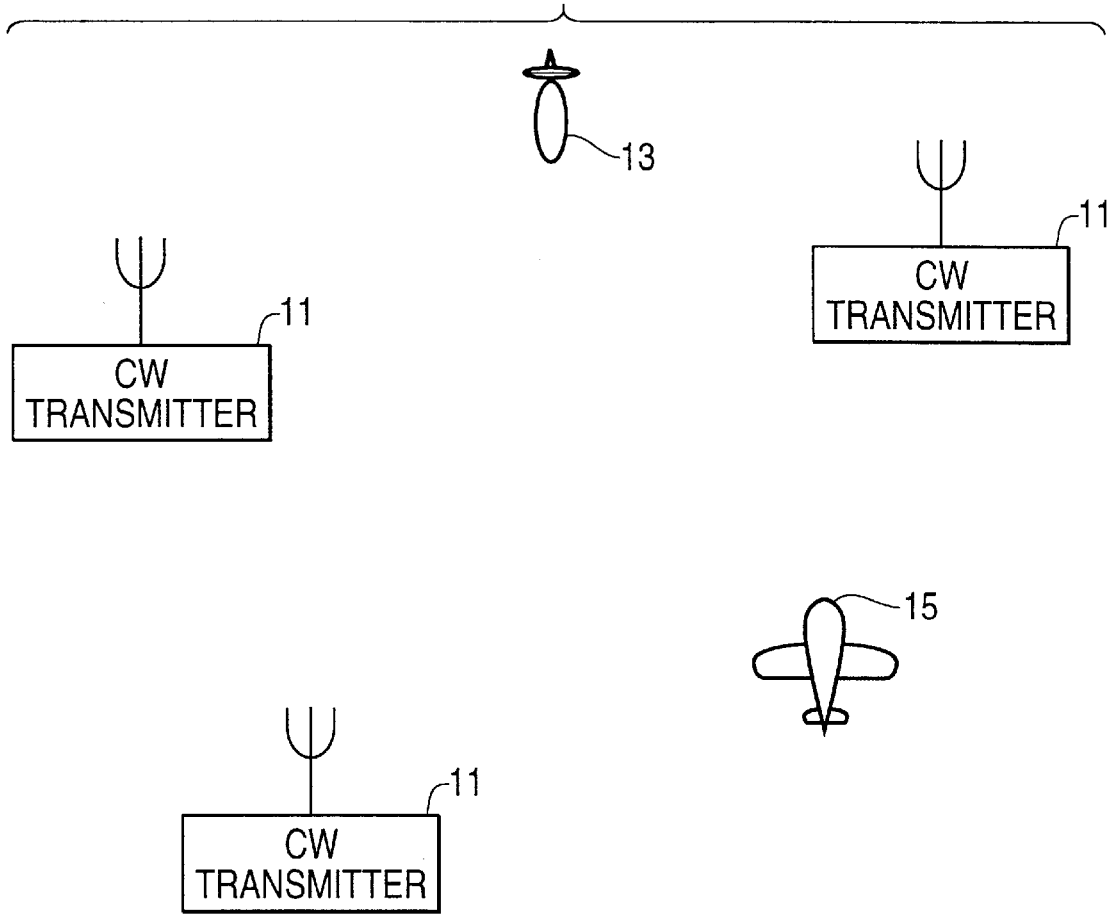
FIG. 1 is a diagram illustrating the operation of the system of the invention.

In the system of the invention, as shown in FIG. 1, continuous wave (CW) transmitters 11 transmit CW radar signals to be reflected from the missile 13 as it travels from its launch point in the initial trajectory of the missile. The reflected signals are detected by a receiver mounted on a movable platform 15, such as an aircraft. The reflected signals are received as the missile travels in its initial trajectory from its launch point through the BECO position and through a portion of the trajectory beyond the BECO position.

Figure 2:
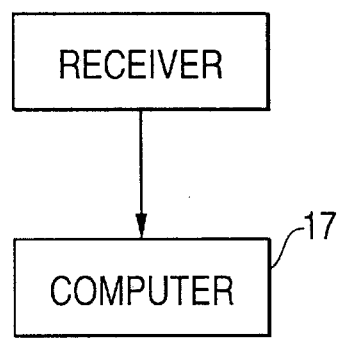
FIG. 2 is a block diagram illustrating a portion of the system of the present invention.
Figure 3:
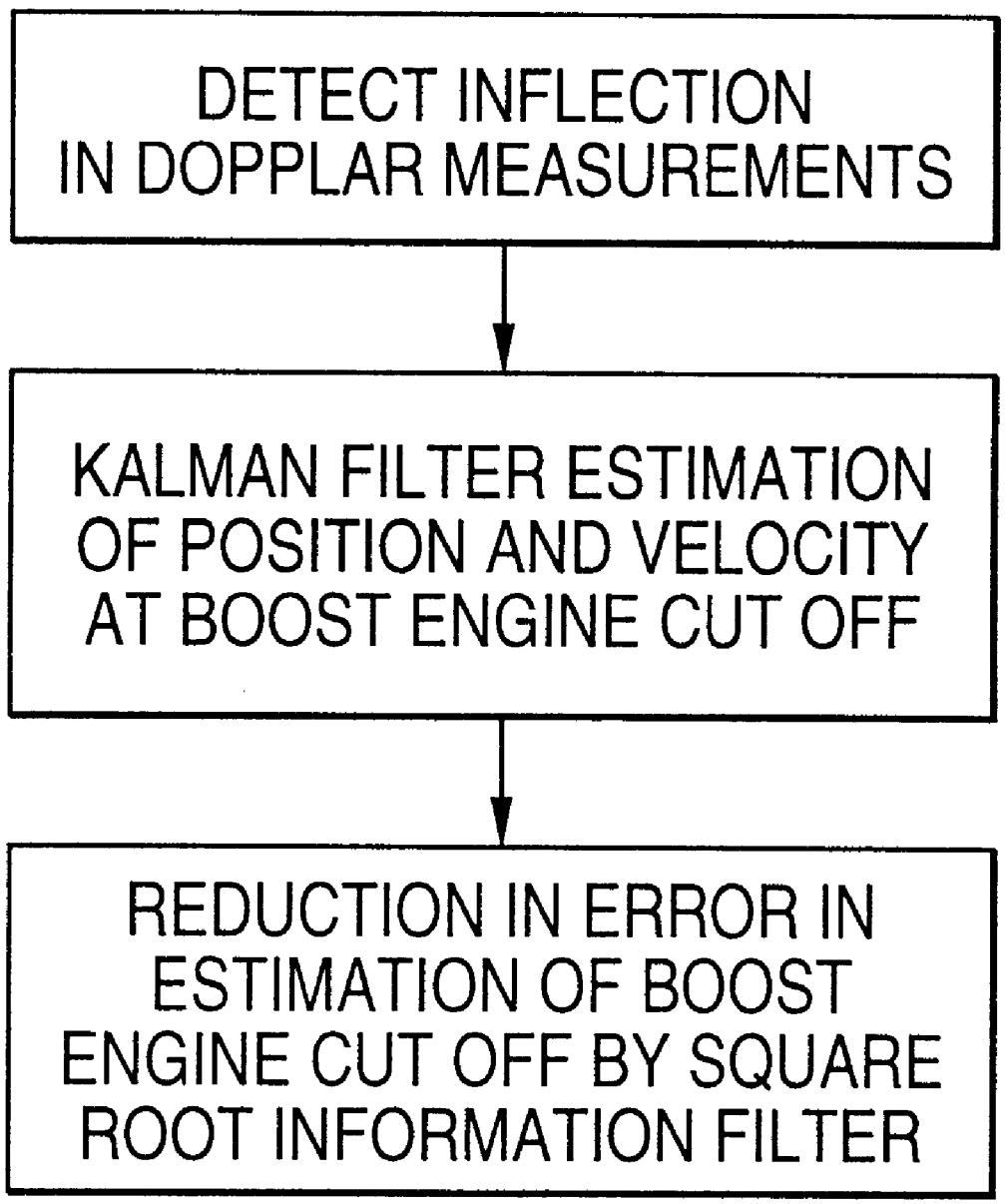
FIG. 3 is a flow chart of the process used in the present invention.

As shown in FIG. 2, the signals received by the antenna on the aircraft are applied to a computer 17 in which the Doppler measurements are processed in accordance with the present invention to provide an estimate of the BECO time. The flow chart of a program employed in the computer 17 to estimate the BECO time from the received Doppler measurements is shown in FIG. 3. A source code listing of this program in Mathematica is found in the Appendix to this application. As shown in FIG. 3, the program first detects the inflection in the Doppler measurement which is known to occur at the BECO time and from the occurrence of this inflection, the program makes an initial estimate of the BECO time. More specifically, the Doppler measurements will vary with the velocity of the missile and the missile velocity will reach a maximum at the BECO time. By numerically differentiating the Doppler measurements, the time of the inflection can be detected to provide the initial estimate of the BECO time.

In addition, as shown in the flow chart, the system of the invention employs a Kalman filter to provide data on the position and velocity of the missile as it travels from the launch point to the BECO position. This position and velocity data is propagated by the Kalman filter to the estimated BECO time to provide initial estimates of the position and velocity at the BECO time. These initial estimates are provided to a square root information filter (SRIF), which reduces the error in the BECO time to a minimum in response to the Doppler shift in the signals reflected from the missile following the BECO time.

The Ballistic Model

The trajectory of the missile after the BECO time is represented by the following equation model:

$$\ddot{P}(t) = D(t) - \mu P(t)/|P(t)|^3 \qquad (1)$$

in which D(t) is atmospheric drag, $\mu$ is the gravitational constant, and P(t) is the missile position as a function of time. $\ddot{P}(t)$ accordingly is the missile acceleration as a function of time. From this equation, the missile free flight trajectory following BECO can be computed. The atmospheric drag D(t) is modeled as follows:

$$D(t) = -(1/2)(KC_D A \rho |\dot{P}(t)|/M)\dot{P}(t) \qquad (2)$$

in which K is the drag uncertainty factory (nominally 1), $C_D$ is the coefficient of drag, A is the cross-sectional area of the missile, $\rho$ is the atmospheric density and M is the mass. $\dot{P}(t)$ represents velocity as a function of time. The initial values $P(t_{co})$ and $\dot{P}(t_{co})$ at the BECO time $t_{co}$ are provided by the Kalman filter which propagates a state vector of position, velocity, and acceleration values to the estimated BECO time. From the free flight trajectory determined from Equations (1) and (2) Doppler measurements are predicted. The Doppler measurement residuals are then computed by subtracting the predicted measurements from the actual measurements. These residuals are then used in the square root information filter as described below to calculate the BECO time and the drag uncertainty factor.

BECO Estimation

The first estimate of the BECO time $t_{co}$ is obtained from the Doppler inflection point as described above. This estimate is then improved as follows. The cutoff parameters to be estimated are:

$$C = [t_{co}, K]^T$$

in which $t_{co}$ is the time of BECO and K is a drag uncertainty factor. The position and velocity at $t_{co}$ are not estimated by this part of the algorithm to ensure continuity of the powered flight and free flight tracks. The initial estimates of the cutoff parameters are provided together with their standard deviations. As indicated above, the initial estimate of $t_{co}$ is obtained from the Doppler measurement inflection point. The initial estimate of K is 1. From the standard deviations $\sigma_i$, we form a diagonal covariance matrix. The a priori data is denoted by:

$$\tilde{C}, \tilde{P}_c = diag(\sigma_i^2)$$

Using the Kalman filter, the state vector of position, velocity and acceleration of the missile is propagated to the estimated $t_{co}$ and the ballistic model of Equation (1) is invoked to predict the Doppler measurements in the free fall trajectory corresponding to Equation (1). The difference between the actual Doppler measurements and the predicted Doppler measurements provides the set of Doppler measurement residuals denoted by:

$$\Delta f_i, \text{for } 1 \leq i \leq m$$

By perturbing each of the cutoff parameters individually and invoking the ballistic model again, the Jacobian matrix of partial derivatives of the measurements with respect to the cutoff parameters is numerically computed as follows:

$$H = \begin{bmatrix} \partial f_1 / \partial t_{co} & \partial f_1 / \partial K \\ . & . \\ . & . \\ . & . \\ \partial f_m / \partial t_{co} & \partial f_m / \partial K \end{bmatrix}$$

We seek a weighted least squares solution for the cut-off parameters C. That is, each measurement is to be weighted by its standard deviation $\sigma_d$. Thus, we define the matrix W:

$$W = diag(1/\sigma_d)$$

in which it is understood that $\sigma_d$ has a different value for each measurement. The weighted and linearized measurement equation is:

$$W\Delta f = WH\Delta C + v$$

in which the random measurement noise v has zero mean and unit covariance. Define:

$$\tilde{R} = diag(1/\sigma_i)$$

$$\tilde{v} = \tilde{R}(\tilde{C} - C)$$

Note that $\tilde{v}$ has zero mean and unit covariance. The a priori data equation is:

$$0 = \tilde{R}(C - \tilde{C}) + \tilde{v} = \tilde{R}\Delta C + \tilde{v}$$

We seek a least squares solution to:

$$\begin{bmatrix} \tilde{R} \\ WH \end{bmatrix} \Delta C = \begin{bmatrix} 0 \\ W\Delta f \end{bmatrix} - \begin{bmatrix} \tilde{v} \\ v \end{bmatrix}$$

Using the SRIF algorithm, this expression is reduced to the equivalent least squares problem:

$$\begin{bmatrix} \hat{R} \\ 0 \end{bmatrix} \Delta C = \begin{bmatrix} \hat{f} \\ e \end{bmatrix} - \begin{bmatrix} \hat{v} \\ v_e \end{bmatrix}$$

where $\hat{R}$ is upper triangular. The least squares solution is:

$$(\widehat{\Delta C}) = R^{-1} \hat{f}$$

Thus, we have a new estimate of the cutoff parameters and the associated covariance matrix:

$$\hat{C} = \tilde{C} + \hat{R}^{-1} \hat{f}$$

$$\hat{P}_c = \hat{R}^{-1} \hat{R}^{-T}$$

This entire procedure is iterated until $(\widehat{\Delta C})$ is sufficiently small, $\Delta f$ increases, or the maximum number of iterations has been completed.

The above description is of a preferred embodiment of the invention and modification may be made thereto without departing from the spirit and scope of the invention, which is defined in the appended claims.

APPENDIX

```
(*
FUNCTION beco ESTIMATES THE
BOOST ENGINE CUTOFF PARAMETERS AND COVARIANCE
*)
beco[x__,p__,tcoa__,ka__,sdcp__]:=
Block[{
tco,k,pc,
dtco,dk,
xa,pa,tpecf,tvecf,
fdmp0,fdmp1,fdmp2,fdscale,
wh1,wh2,wdf,wdfnew,wdfold,
sat,sa,s,
rhat,irhat,fhat,dcp,
tibgn,tiend,titbl,
itr,maxitr,iend},
(*
INITIALIZE CUTOFF PARAMETERS AND FORM COVARIANCE
*)
tco = tcoa;
k = ka;
pc = DiagonalMatrix[Table[sdcp[[i]] 2, {i,1,2}]];
(*
A PRIORI SQUARE ROOT INFORMATION MATRIX
*)
rhat = DiagonalMatrix[Table[1.0/sdcp[[i]], {i,1,2}]];
(*
PERTURBATIONS TO CUTOFF PARAMETERS AND
TOLERANCES FOR CONVERGENCE
*)
dtco = 0.1; (* DELTA TCO (SEC) *)
dk = 0.1; (* DELTA K FACTOR *)
fdscale = 1; (* DOPPLER SCALE FACTOR *)
(*
COMPUTE CORRECTIONS TO CUTOFF PARAMETERS
UNTIL TOLERANCES SATISFIED, RESIDUALS INCREASE,
OR MAXIMUM ITERATIONS EXCEEDED
*)
```

APPENDIX-continued

```
maxitr = 5;
iend = 0;
For[itr=1, itr<=maxitr && iend==0, itr++,
(*
INVOKE KF/BALLISTIC MODEL FOR COMPUTATION OF
PREDICTED DOPPLER MEASUREMENTS
*)
{xa,pa} = extrap[x,p,tco-tco1];
{tpecf,tvecf,fdmp0} = ballistic[tco,xa[[{1,2,3}]],xa[[{4,5,6}]],k];
(*
PERTURB TCO AND INVOKE KF/BALLISTIC MODEL FOR
COMPUTATION OF PREDICTED DOPPLER MEASUREMENTS
*)
{xa,pa} = extrap[x,p,tco+dtco-tco1];
{tpecf,tvecf,fdmp1} = ballistic[tco+dtco,xa[[{1,2,3}]],xa[[{4,5,6}]],k];
(*
PERTURB K AND INVOKE KF/BALLISTIC MODEL FOR
COMPUTATION OF PREDICTED DOPPLER MEASUREMENTS
*)
{xa,pa} = extrap[x,p,tco-tco1];
{tpecf,tvecf,fdmp2} = ballistic[tco,xa[[{1,2,3}]],xa[[{4,5,6}]],k+dk];
(*
FORM THE AUGMENTED INFORMATION ARRAY
FOR THE SRIF
*)
tibgn - Quotient[tco,tscan] + 1;
tiend = Quotient[tig2,tscan];
titbl = Table[i, {i,tibgn,tiend}];
wh1 = (fdscale/dtco) * Flatten[(fdmp1-fdmp0)/fdsdm[[titbl]]];
wh2 = (fdscale/dk) * Flatten[(fdm2-fdmp0)/fdsdm[[titbl]]]
wdf = fdscale * Flatten[(fdmm[[titbl]]-fdmp0)/fdsdm[[titbl]]];
sat = {};
AppendTo[sat, Join[rhat[[{1,2},1]],wh1]];
AppendTo[sat, Join[rhat[[{1,2},2]],wh2]];
AppendTo[sat, Join[{0,0},wdf]];
sa = Transpose[sat];
(*
TEST FOR INCREASE IN RESIDUALS
*)
If[
itr > 1
(* Then *),
wdfold = wdfnew
(* EndIf *)];
wdfnew = wdf.wdf;
(*
If[
itr > 1 &&
wdfnew wdfold
(* Then *),
{tco,k} -= dcp;
iend = 1
(* Else* ),
*)
(*
INVOKE THE SRIF TO UPDATE THE INFORMATION ARRAY
WITH THE MEASUREMENTS
*)
s = srif[2,0,Length[wdf],sa];
(*
UPDATE CUTOFF PARAMETERS AND COVARIANCE
*)
rhat = s[[{1,2},{1,2}]];
fhat = s[[{1,2},3]];
irhat = Inverse[rhat];
dcp = irhat.fhat;
{tco,k} += dcp;
pc = irhat. Transpose[irhat];
(*
TEST FOR CONVERGENCE
*)
If[
Abs[dc[[1]]] < dtco &&
Abs[dcp[[2]]] < dk
(* Then *),
iend = 1
(* EndIf *) ];
(* (* EndIf *) ]; *)
(* EndFor *) ]; itr=;
(*
RETURN CUTOFF PARAMETERS AND COVARIANCE
*)
Return[{tco,k,pc}]
(* EndBlock *)]
(*
FUNCTION ballistic RETURNS THE
PREDICTED TARGET STATE VECTOR AND
DOPPLER MEASUREMENTS
*)
ballistic[tco__,tptco__,tvtco__,k__]:=
Block[{
tpecf,tvecf,fdmp,
p,v,eqns,fcns,odesol,
tibgn,tiend,iiv,leniiv,iindx,
lambda,fd,fdvp},
(*
NUMERICALLY SOLVE ODE'S
SUBJECT TO INITIAL CONDITIONS AT tco
*)
eqns = Join[
Table[p[i]'[t] == v[i][t], {i,1,3}],
Table[v[i]'[t] == accel[{p[1][t], p[2][t], p[3][t]},
   {v[1][t], v[2][t], v[3][t]}, k][[i]], {i,1,3}],
Table[p[i][tco] == tptco[[i]], {i,1,3}],
Table[v[i][tco] == tvtco[[i]], {i,1,3}]];
fcns = Join[
Table[p[i], {i,1;3}],
Table[v[i], {i,1,3}]];
odesol = NDSolve[eqns, fcns, {t,tco,tig2}];
(*
INTERPOLATE ODE SOLUTION AT EACH SCAN BETWEEN
tco,tig2 AND PREDICT DOPPLER MEASUREMENTS
*)
fdmp = {};
tibgn = Quotient[tco,tscan] + 1;
tiend = Quotient[tig2,tscan];
Do[
fdvp = {};
iiv = iim[[tindx]];
leniiv = Length[iiv];
tpecf = Table[p[i][tindx*tscan], {i,1,3}]/.odesol[[1]];
tvecf = Table[v[i][tindx*tscan], {i,1,3}]/.odesol[[1]];
Do[
iindx = iiv[[i]];
lambda = c/(illum[[iindx,7]] * 10^6);
fd = doppler[tpecf,tvecf,
   illum[[iindx,2]],lambda,apecf[[tindx]],avecf[[tindx]]];
AppendTo[fdvp,fd]
(* EndDo *), {i,1,leniiv}];
AppendTo[fdmp,fdvp]
(* EndDo *), {tindx,tibgn,tiend}];
(*
RETURN PREDICTED TARGET STATE VECTOR AND
DOPPLER MEASUREMENTS
*)
Return[{tpecf,tvecf,fdmp}]
(* EndBlock *)]
(*
FUNCTION accel RETURNS THE
TARGET BALLISTIC FLIGHT ACCELERATION (KM/SEC^2)
*)
accel[tpecf__,tvecf__,k__] :=
Block[{
taecf,
tpmag,tvmag,tarea},
tpmag = Sqrt[tpecf.tpecf];
tvmag = Sqrt[tvecf.tvecf];
tarea = Pi*(trad^2) //N;
taecf = -(0.5*10^9*k*tcd*tarea*atmsdens[tpecf]*tvmag/tmbeco)*tvecf -
   mu*(tpmag^-3)*tpecf - 2.0*Cross[{0,0,omega},tvecf];
(*
RETURN TARGET ACCELERATION (KM/SEC^2)
*)
Return[taecf]
(* EndBlock *)]*
Null
```

We claim:

1. A method of determining the time of boost engine cutoff of a missile comprising illuminating said missile with adar signals as it travels through its trajectory from its launch point through its boost engine cutoff position, said trajectory including a trajectory portion extending beyond said boost engine cutoff position, receiving Doppler shifted signals reflected from said missile as said missile travels through said trajectory, detecting an inflection in Doppler measurements of the received signals and using the time of said inflection as an initial estimate of the time of said boost engine cutoff, and reducing the error in said initial estimate of the time of said boost engine cutoff to a minimum by differential correction in response to Doppler measurements of the received signals reflected from said missile as it travels through said portion of said trajectory extending beyond said boost engine cutoff position.

2. A method as recited in claim 1, wherein the error in the initial estimate of the time of the boost engine cut off is reduced by square root information filter.

3. A method as recited in claim 2, wherein the missile trajectory after boost engine cut off is modeled by a ballistic model equation, wherein Doppler measurements are predicted for the trajectory of the missile corresponding to said ballistic model equation and wherein Doppler measurement residuals are determined from the difference between said predicted Doppler measurements and actual Doppler measurements and said square root information filter uses said Doppler measurement residuals to reduce the error in the estimate of said boost engine cut off to a minimum.

4. A method as recited in claim 1, further comprising estimating the position and velocity of said missile at the time of said boost engine cutoff in response to the Doppler signals reflected from said missile during the travel of said missile from the launch point of said missile to said boost engine cutoff position, said differential correction employing the estimate of the missile position and velocity at the time of said boost engine cutoff as initial estimates of these parameters in the process of reducing the error in initial estimate of the time of said boost engine cutoff by differential correction.

5. The method as recited in claim 4, wherein the estimation of the position and velocity of the missile at the time of the boost engine cut off is provided by a Kalman filter.

6. A method as recited in claim 4, wherein the error in the initial estimate of the time of the boost engine cut off is reduced by a square root information filter.

7. A method as recited in claim 4, wherein the missile trajectory after boost engine cut off is modeled by a ballistic model equation, wherein Doppler measurements are predicted for the trajectory of the missile corresponding to said ballistic model equation and wherein Doppler measurement residuals are determined from the difference between said predicted Doppler measurements and actual Doppler measurements and said square root information filter uses said Doppler measurement residuals to reduce the error in the estimate of the boost engine cut off time to a minimum.

* * * * *